Feb. 26, 1952  F. U. SMITH  2,587,397
RAT AND MOUSE EXTERMINATOR
Filed Aug. 9, 1948
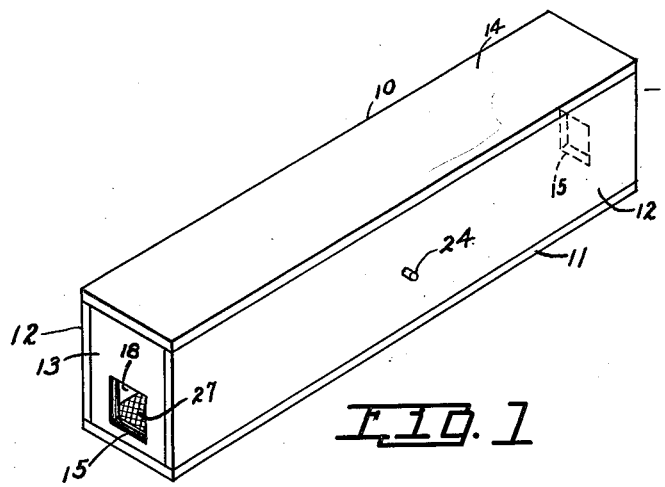
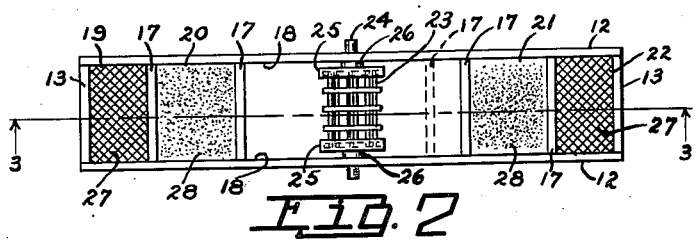
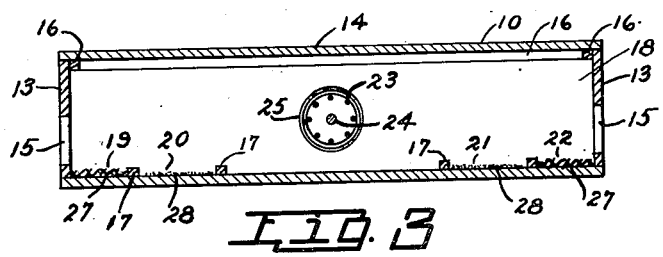
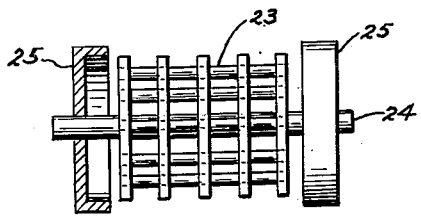
Inventor
FREDRICK U. SMITH
By
J. B. Dickman, Jr.
Attorney Patented Feb. 26, 1952

2,587,397

UNITED STATES PATENT OFFICE 2,587,397

RAT AND MOUSE EXTERMINATOR

Fredrick U. Smith, Chestertown, Md.

Application August 9, 1948, Serial No. 43,208

1 Claim. (Cl. 43—131)

The present invention relates to rat and mouse killing devices and has for one of its objects to provide a simple and efficient rodent killing device.

Another object of the present invention is the provision of a safe rat killing device, whereby domestic animals, children and pets will be unable to contact poison in said device.

A still further object of the present invention is to provide a simple, compact device of the character described having no moving parts to get out of order.

A still further object of the present invention is the provision of a rat killing device which requires no attention for long periods of time.

Other and further objects of the present invention will appear in the following description and in the drawing.

Figure 1 is a perspective view of my novel device.

Figure 2 is a top plan view with the cover removed, looking down into the box.

Figure 3 is a longitudinal sectional view taken on line 3—3 of Figure 1, and

Figure 4 is a side elevational view of the wire food container and showing the ends removed from the container, one of the ends being shown in section.

In the drawing the numeral 10 represents a box of any suitable size and shape and made of any suitable material, and having a base or floor 11, sides 12, ends 13 and a removable top 14, the ends 13 being provided with openings or doorways 15 that are in alignment with each other. The top 14 is provided with inset cleats or ribs 16 that prevent casual displacement of the top 14. The base or floor 11 is provided with transverse strips 17 that are adjustable as shown by the dotted lines in Figure 2, and they are of a length that the ends the strips snugly engage the inner faces 18 of the side walls thus providing means for dividing the base or floor into partitioned compartments 19, 20, 21 and 22 of various sizes. Within the housing is a rotatable food cylinder or container 23 of wire material in the form of reticulated material that is mounted on an axle 24, the ends 25 of the container being removable. The removable cup-shaped ends 25 are spaced from the inner faces 18 of the side walls 12 by washers 26. The rod or axle 24 may, if desired, have threaded ends (not shown) to receive nuts (not shown).

In compartments 19 and 22 may be placed a moisture retaining material 27, and in compartments 20 and 21 there is placed a poison powder 28.

In the operation of the device a suitable food to attract rats or mice is placed in the container 23, and the end cups placed in position, the poison is sprinkled in compartments 20 and 21. In compartments 19 and 22 there is placed a moisture retaining material 27. The rats attracted by the food in the cylinder or container 23 enter the doorways or openings 15. As they move towards the cylinder their feet become damp from contact with the moistened material 27 and when they step into compartments 20 and 21 containing the poison powder 28 the powder adheres to their feet setting up an irritation. In order to relieve the irritation the rats lick their feet thus taking the poison into their bodies with the result the poison kills them.

Obvious modifications in the form and arrangements of parts as illustrated may be made without departing from the spirit and scope of the invention as defined in the appended claim.

I claim:

A device of the character described comprising an elongated rectangular housing provided with a removable top, there being entrance openings in the end walls of said housing, transverse strips in spaced relation from the end walls of said housing and to each other defining areas on the floor of said housing, a moisture retaining material in the area at the entrance openings and a poison material in the area adjacent the area containing the moisture retaining material, a reticulated container in said housing, an axle in said reticulated container, the ends of said axle seating in apertures in the side walls of said housing and supporting said reticulated container in said housing midway the ends and the top and bottom edges of the side walls, said container containing bait to attract rodents.

FREDRICK U. SMITH.

REFERENCES CITED

The following references are of record in the file of this patent:

UNITED STATES PATENTS

| Number | Name | Date |
|---|---|---|
| 986,612 | Warner | Mar. 14, 1911 |
| 1,309,606 | Bartholomew | July 15, 1919 |
| 1,964,611 | Watson | June 26, 1934 |
| 2,157,953 | De Long | May 9, 1939 |
| 2,205,125 | Rose | June 18, 1940 |

FOREIGN PATENTS

| Number | Country | Date |
|---|---|---|
| 239,889 | Switzerland | Mar. 1, 1946 |